United States Patent
Quinn et al.

(10) Patent No.: US 12,277,325 B2
(45) Date of Patent: Apr. 15, 2025

(54) METHOD AND APPARATUS FOR SNAPSHOT CREATION

(71) Applicant: Dell Products L.P., Round Rock, TX (US)

(72) Inventors: Brett Quinn, Cotuit, MA (US); Evan Jones, Glenville, NY (US); Peter Callewaert, Puurs-Sint-Amands (BE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/356,632

(22) Filed: Jul. 21, 2023

(65) Prior Publication Data

US 2025/0028452 A1  Jan. 23, 2025

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01)
(58) Field of Classification Search
CPC ........... G06F 3/0619; G06F 3/06; G06F 3/067
See application file for complete search history.

(56) References Cited

U.S. PATENT DOCUMENTS

| | | | |
|---|---|---|---|
| 11,409,622 B1* | 8/2022 | Kaushik | G06F 11/2069 |
| 2020/0065399 A1* | 2/2020 | Desai | G06F 9/45558 |
| 2021/0157677 A1* | 5/2021 | Vokaliga | G06F 11/1451 |
| 2022/0027311 A1* | 1/2022 | Hu | G06F 16/128 |

* cited by examiner

*Primary Examiner* — Gurtej Bansal
(74) *Attorney, Agent, or Firm* — Daly, Crowley, Mofford & Durkee, LLP (57) ABSTRACT

A method, comprising: retrieving a VDG definition; processing the VDG definition to identify a primary storage system and one or more secondary storage systems; detecting a consistency formation event; transmitting a first instruction to initialize one or more data structures for a first snapshot of a volume that is stored in the primary storage system; transmitting, to each of the secondary storage systems, a respective second instruction to initialize one or more data structures for a respective snapshot of a copy of the volume that is stored in that secondary storage system; suspending servicing of input-output (I/O) by the primary storage system; transmitting to the primary storage system a third instruction to complete the first snapshot of the volume; transmitting to each of the secondary storage systems a respective fourth instruction to complete a respective snapshot of the copy of the volume; and resuming servicing of I/O.

15 Claims, 5 Drawing Sheets

```
**********************************
* DEFINE A VDG NAMED VDG_DEF *
**********************************
DEFINE VDG VDG_DEF,
       CYCLE_TIME(10,0),         ←—342
       CONSISTENT(YES),
       MAXRC(4)

********************************************************
* ADD PRIMARY R1 DEVICE 550 ON STORAGE SYSTEM 8000 *
********************************************************
MODIFY VDG VDG_DEF,ADD,         ←—344
       SYMDEV(8000,550)

********************************************************
* ADD SECONDARY R2 DEVICE 650 ON STORAGE SYSTEM 9000 *
********************************************************
MODIFY VDG VDG_DEF,ADD,         ←—346
       SYMDEV(9000,650)
```

METHOD AND APPARATUS FOR SNAPSHOT CREATION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: retrieving a cross-platform version data group (VDG) definition; processing the VDG definition to identify a primary storage system and one or more secondary storage systems as targets for snapshot creation; detecting a consistency formation event; transmitting, to the primary storage system, a first instruction to initialize one or more data structures for a first snapshot of a volume that is stored in the primary storage system; transmitting, to each of the secondary storage systems, a respective second instruction to initialize one or more data structures for a respective snapshot of a copy of the volume that is stored in that secondary storage system; suspending servicing of input-output (I/O) by the primary storage system after each of the first and second instructions has been transmitted; transmitting to the primary storage system a third instruction to complete the first snapshot of the volume that is stored in the primary storage system; transmitting to each of the secondary storage systems a respective fourth instruction to complete a respective snapshot of the copy of the volume that is stored in that secondary storage system; and resuming servicing of I/O by the primary storage system.

According to aspects of the disclosure, a system is provided, comprising: a memory; and at least one processor that is operatively coupled to the memory, the at least one processor being configured to perform the operations of: retrieving a cross-platform version data group (VDG) definition; processing the VDG definition to identify a primary storage system and one or more secondary storage systems as targets for snapshot creation; detecting a consistency formation event; transmitting, to the primary storage system, a first instruction to initialize one or more data structures for a first snapshot of a volume that is stored in the primary storage system; transmitting, to each of the secondary storage systems, a respective second instruction to initialize one or more data structures for a respective snapshot of a copy of the volume that is stored in that secondary storage system; suspending servicing of input-output (I/O) by the primary storage system after each of the first and second instructions has been transmitted; transmitting to the primary storage system a third instruction to complete the first snapshot of the volume that is stored in the primary storage system; transmitting to each of the secondary storage systems a respective fourth instruction to complete a respective snapshot of the copy of the volume that is stored in that secondary storage system; and resuming servicing of I/O by the primary storage system.

According to aspects of the disclosure, a non-transitory computer-readable medium is provided that stores one or more processor-executable instructions, which, when executed by at least one processor, cause the at least one processor to perform the operations of: retrieving a cross-platform version data group (VDG) definition; processing the VDG definition to identify a primary storage system and one or more secondary storage systems as targets for snapshot creation; detecting a consistency formation event; transmitting, to the primary storage system, a first instruction to initialize one or more data structures for a first snapshot of a volume that is stored in the primary storage system; transmitting, to each of the secondary storage systems, a respective second instruction to initialize one or more data structures for a respective snapshot of a copy of the volume that is stored in that secondary storage system; suspending servicing of input-output (I/O) by the primary storage system after each of the first and second instructions has been transmitted; transmitting to the primary storage system a third instruction to complete the first snapshot of the volume that is stored in the primary storage system; transmitting to each of the secondary storage systems a respective fourth instruction to complete a respective snapshot of the copy of the volume that is stored in that secondary storage system; and resuming servicing of I/O by the primary storage system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Protecting data from widespread logical corruption is the next evolution of business continuity planning. Storage hardware-based data protection mechanisms are often coupled with disaster recovery remote replication methods to provide a complete business continuity solution, providing both data protection and data recovery capabilities.

The most advanced users of such solutions replicate data synchronously (and often additionally asynchronously to a tertiary site) to provide for continuous availability in the event of a disaster, and routinely swap the synchronously replicated primary and secondary sites so that disaster recovery procedures are implicitly well practiced and tested. This is often called an 'interchangeable data centers' configuration.

Protection from logical corruption is usually provided by local replication at one of these sites that create frequent, space-efficient, pointer-based point-in-time copies of the data, such as provided by Dell zDP. However, recovery from a point-in-time copy taken at one of these synchronously replicated sites requires the resynchronization of this 'good' data to the other site, which can take some time, even if done incrementally. In addition, it would be desirable to take these point-in-time copies at both sites so that this logical corruption protection is available in either site in an interchangeable data center scheme.

Taking copies in a manner that preserves data integrity requires halting write I/O to all volumes briefly, which can impact application processing. Taking two such copies (one per site) doubles the impact, which would be intolerable if frequent copies are desired. In this regard, the present disclosure provides a framework that requires I/Os to be halted only once when taking two copies of the volume (one per site), which in turn increases the security of the stored data, while minimizing the overhead associated with creating copies of the data.

Figure 1:
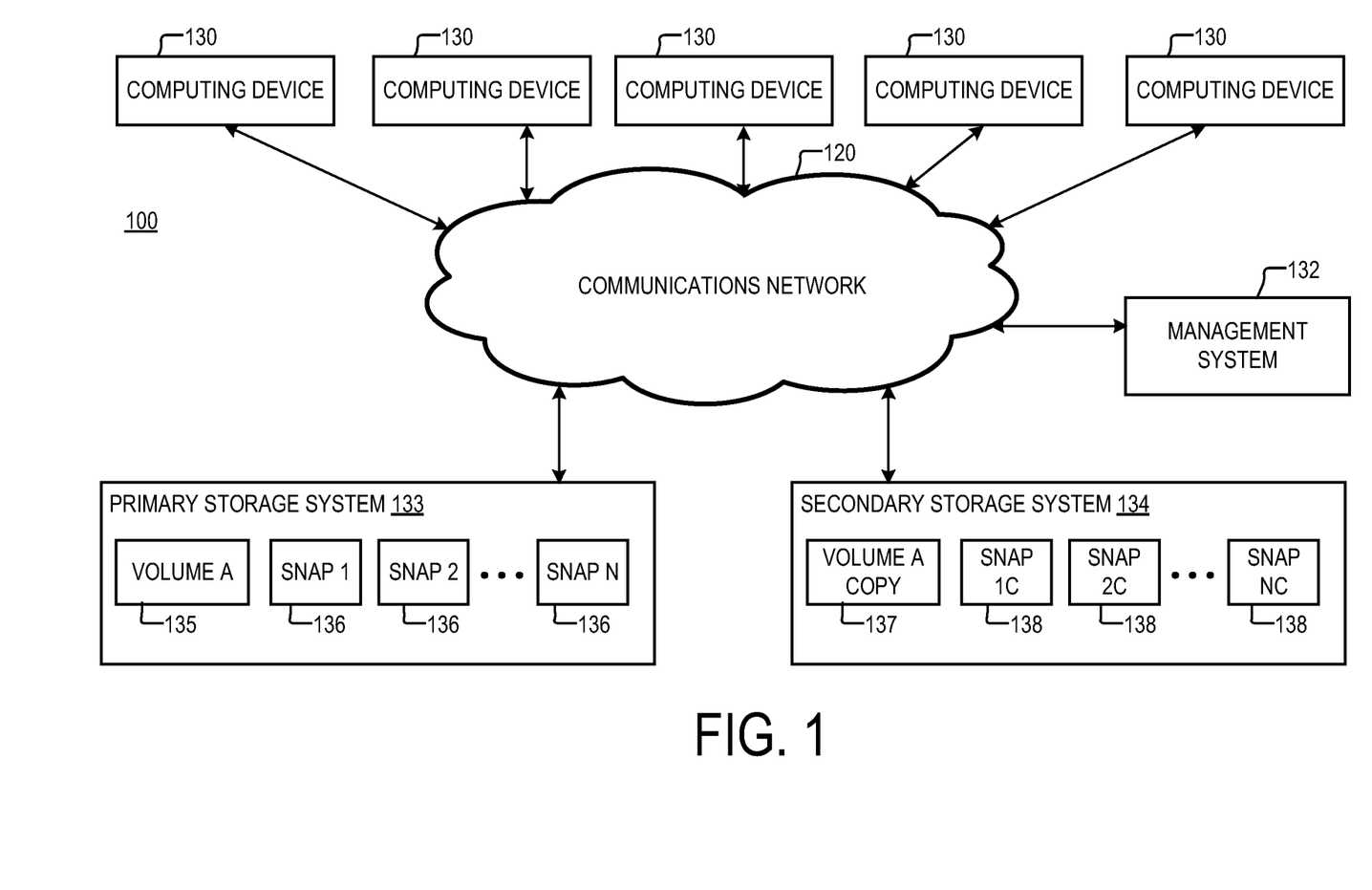
FIG. 1 is a diagram of an example of a system, according to aspects of the disclosure.

FIG. 1 is a diagram of an example of a system 100, according to aspects of the disclosure. As illustrated, system 100 may include a primary storage system 133 and a secondary storage system 134 that are coupled to a plurality of computing devices 130 and a management system 132 via communications network 120. Each of the primary storage system 133 and the secondary storage system 134 may be the same or similar to the storage system 200, which is discussed further below with respect to FIG. 2. Each of the computing devices 130 may include a smartphone, a desktop, a laptop, and/or any other device that might be used by a user to store and retrieve data from the primary storage system 133. The communications network 120 may include one or more of the Internet, a local area network (LAN), a wide area network (WAN), an InfiniBand network, a mobile data network, etc. Management system 132 may include a computing system that is used by a system administrator to manage and configure storage systems 133 and 134.

The primary storage system 133 may be configured to implement a volume 135. In addition, the primary storage system 133 may be configured to create snapshots 136 of volume 135 at predetermined time intervals. The secondary storage system 134 may be configured to store a copy 137 of volume 135. In addition, the secondary storage system 134 may be configured to store snapshots 138 of copy 137. Copy 137 of volume 135 may be a volume itself, and it may be an image of volume 135. In some implementations, copy 137 may be created by using synchronous replications of I/O requests that are incoming to the primary storage system 133. Alternatively, in some implementations, copy 137 may be created by using asynchronous replication and/or in any other suitable manner. Stated succinctly, the present disclosure is not limited to any specific method for creating copy 137.

Figure 2:
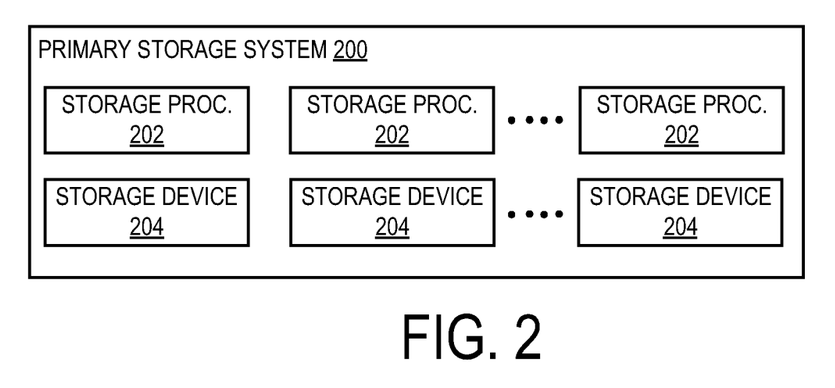
FIG. 2 is a diagram of an example of a storage system, according to aspects of the disclosure.

FIG. 2 is a diagram of an example of a storage system 200, according to aspects of the disclosure. The storage system 200 may include any suitable type of storage system, such as the Dell PowerMax™ storage system. As such, the storage system 200 may include a plurality of storage processors 202 and a plurality of storage devices 204 In some implementations, each of the storage devices 204 may include a Solid-State Drive (SSD), a Non-Volatile Memory Express (NVME) device, a hard disk, and/or any other suitable type of storage device. In some implementations, each of the storage processors 202 may include a computing device, such as the computing device 500, which is discussed further below with respect to FIG. 5. Each of the storage processors may be configured to receive I/O requests from the computing devices 130 and fulfill those requests by reading or writing data to the storage devices 204.

Figure 3A:
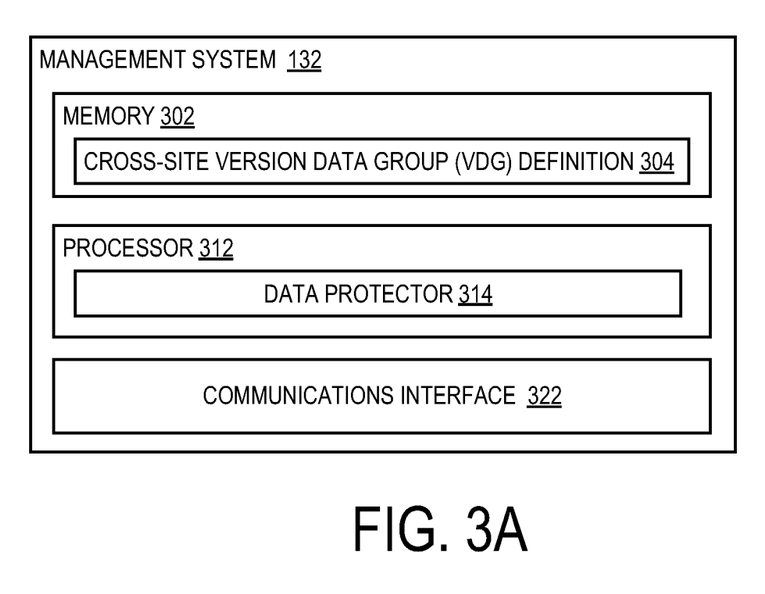
FIG. 3A is a diagram of an example of an array management system, according to aspects of the disclosure.

FIG. 3A is a diagram of the management system 132, according to aspects of the disclosure. As illustrated, the management system 132 may include a memory 302, a processor 312, and a communications interface 322. Memory 302 may include any suitable type of volatile or non-volatile memory, such as a solid-state drive (SSD), a hard disk (HD), a random-access memory (RAM), a Synchronous Dynamic Random-Access Memory (SDRAM), etc. Processor 312 may include any suitable type of processing circuitry, such as one or more of a general-purpose process (e.g., an x86 processor, a MIPS processor, an ARM processor, etc.), a special-purpose processor, an application-specific integrated circuit (ASIC), a field programmable gate array (FPGA), etc. The communications interface 322 may include any suitable type of communications interface. By way of example, the communications interface 322 may include one or more of an InfiniBand host bus adapter, an Ethernet adapter, or a Bluetooth adapter for example.

Memory 302 may be configured to store a cross-site version data group (VDG) definition 304. As used throughout the disclosure, the term VDG definition shall refer to any suitable type of script, configuration file, text file, database entry, or object that at least in part governs and/or specifies the manner in which the management system 132 performs snapshot replication. In one example, the VDG definition 304 may identify a plurality of storage systems, such as storage systems 133 and 134. For each of the storage systems, the VDG definition 304 may identify one or more data volumes that are implemented by the storage systems, such as volumes 135 and 137. In other words, the VDG definition 304 may identify volume, a copy of the volume, as well as the respective storage systems where the volume and volume copy are stored. An example of one possible implementation of the VDG definition 304 is discussed further below with respect to FIG. 3B.

Processor 312 may be configured to execute a data protector 314. The data protector 314 may include any suitable type of software that is configured to create snapshots of a volume and mirror images of the volume. In one example, the data protector 314 may be configured to execute a process 400, which is discussed further below with respect to FIG. 4. In one example, the data protector 314 may be configured to provide a granular level of protection for mainframe assets (or any other assets) so that a processing error, malicious intent, or human error may not cause a data center-wide outage or loss of data recovery capabilities. The data protector 314 uses the concept of snapshots of source volumes (such as volume 135) that allow applications to restore data at a more granular level. The granularity provides point-in-time recovery for both database and non-database systems. With point-in-time copies, selectable recovery points, and the ability to automate backup processes, users can elevate their data center and mission-critical data management to a high level.

Figure 3B:
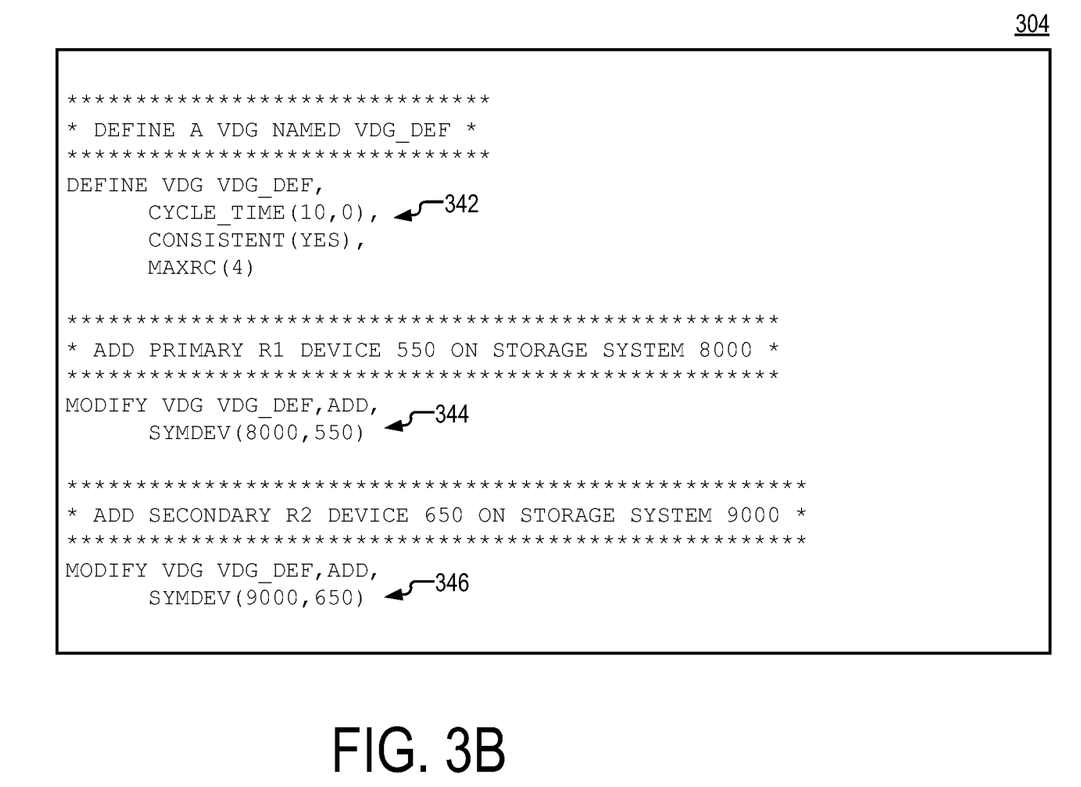
FIG. 3B is a diagram of an example of a cross-site version data group (VDG) definition, according to aspects of the disclosure.

FIG. 3B shows an example of the VDG definition 304, in accordance with one possible implementation. As illustrated, VDG definition 304 may include a general portion 342, a primary device portion 344, and a secondary device portion 346. The general portion 342 may define the name of the VDG definition 304 (i.e., VDG_DEF) and the interval at which a point-in-time event (or another consistency formation event) needs to be generated. Furthermore, VDG definition 304 may include an indication requiring volumes (identified by portions 344 and 346, respectively) to be kept in a consistent state by the data protector 314.

The primary device portion 344 may identify a source volume that is stored on a primary device. According to the present example, the source volume is volume 135 (shown in FIG. 1) and the primary device is the storage system 133. According to the present example, the primary device portion includes the command of "modify vdg vdg_def, add, symdev (8000, 550)", where '8000' is an identifier of volume 135, and '550' is an identifier of storage system 135. In one specific example, '550' may be a primary device descriptor referring to storage devices (e.g., SSD drives, hard drives, etc.) in storage system 133 that represent volume 135. This command causes inclusion of the primary devices in the VDG definition 304.

The secondary device portion 346 may identify a copy of the source volume identified in the primary device portion 344, as well as a secondary device where the copy is stored. According to the present example, the primary device portion 346 includes the command of "modify vdg vdg_def, add, symdev (9000, 650)", where '9000' is an identifier of volume 137, and '650' is an identifier of storage system 134. In one specific example, '550' may be a secondary device descriptor referring to storage devices (e.g., SSD drives, hard drives, etc.) in storage system 134 that represent volume 137. This command causes inclusion of the secondary devices in the VDG definition 304.

Although, in the example of FIG. 3B, only one primary storage system (or device) is identified in portion 344, alternative implementations are possible in which multiple primary storage systems are identified. Although, in the present example, portion 344 identifies only one source volume, alternative implementations are possible in which multiple source volumes are identified in portion 344. The source volumes may be stored in the same or different primary storage systems. Although, in the present example, portion 346 identifies only one copy of the source volume identified in portion 344, alternative implementations are possible in which portion 346 identifies multiple copies of the source volume, as well as the respective storage system where each copy is stored. Although, in the present example, VDG definition 304 is stored in the memory of management system 132, alternative implementations are possible in which the VDG definition is stored remotely.

In some implementations, for each volume that is identified in portion 344, portion 346 may identify at least one respective copy of the volume and the storage system where the copy is stored. Additionally or alternatively, in some implementations, portion 346 may identify only copies of volumes that are listed in portion 344, such that no volume is identified in portion 346 which does not have a counterpart in portion 344 and which is not a copy of a source volume in portion 344. Put differently, for each volume that is identified in portion 344, portion 346 may identify at least one copy of the volume, as well as the storage system where the copy is stored. Although, in FIG. 3B, portions 344 and 346 are represented as discrete segments of VDG definition 304, alternative implementations are possible in which different parts of portions 344 and 346 are interleaved.

Under the nomenclature of the present disclosure "a source volume" is the volume from where data is retrieved when a read request for the volume is received, and a copy of the source volume is an image of the source volume that is maintained as a backup, in case the source volume fails. In other words, the source volume is the working copy of data and the copy of the source volume is for backup. Under the nomenclature of the present disclosure, the storage system where a source volume is implemented is referred to as "primary storage system", whereas the storage systems where copies of the source volume are stored are referred to as "secondary storage systems".

Figure 4:
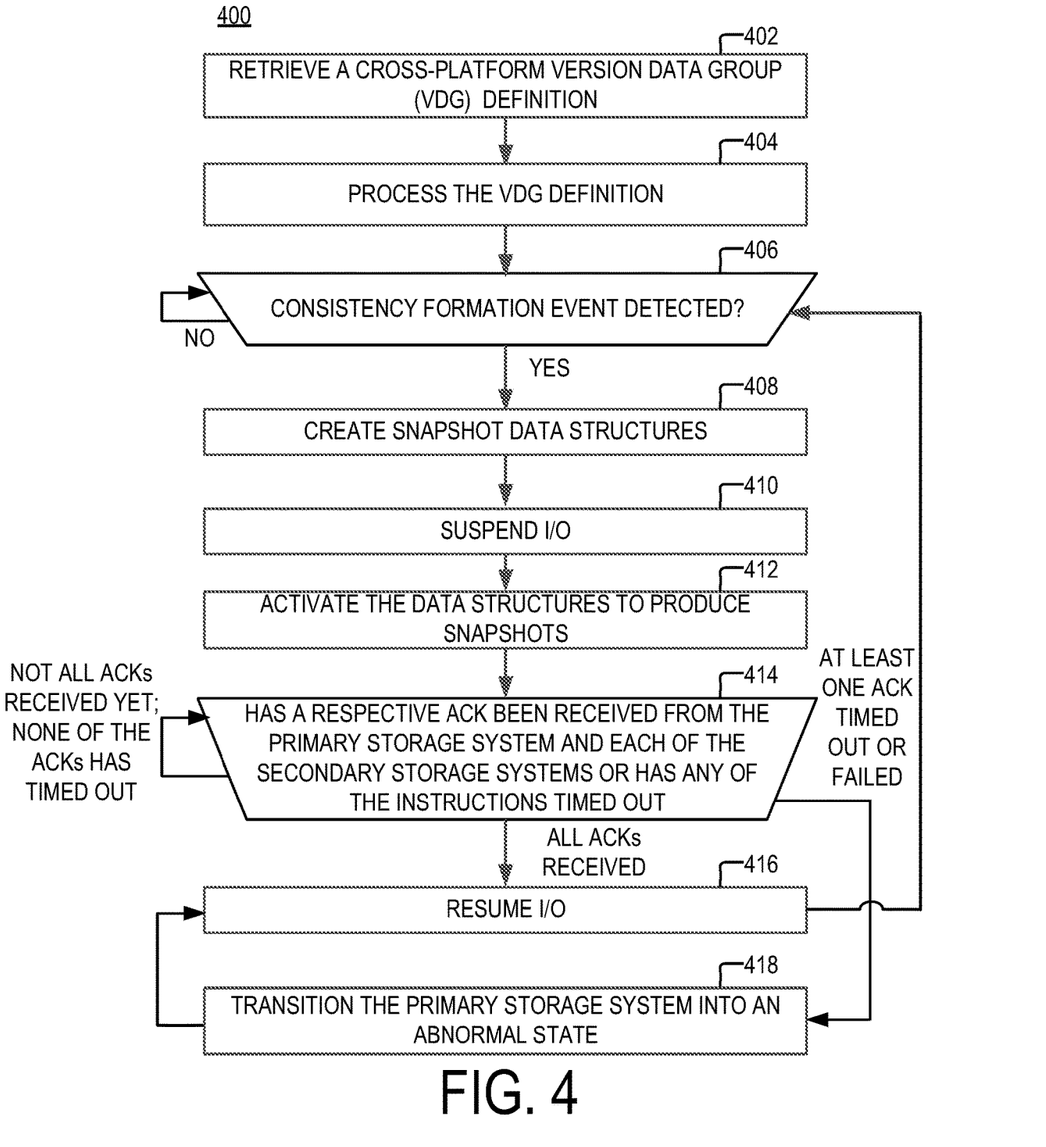
FIG. 4 is a flowchart of an example of a process, according to aspects of the disclosure.

FIG. 4 is a flowchart of an example of a process 400, according to aspects of the disclosure. According to the present example, process 400 is performed by the management system 132. However, alternative implementations are possible in which process 400, or a portion thereof, is performed by another entity. Stated succinctly, the present disclosure is not limited to any specific entity or set of entities performing the process 400.

At step 402, the management system 132 retrieves a cross-platform VDG definition. According to the present example, VDG definition 304 is retrieved.

At step 404, the management system 132 processes the VDG definition to identify a primary storage system that stores a source volume and at least one secondary storage system that stores a copy of the source volume. According to the present example, based on the VDG definition, volume 135 is identified as a source volume, storage system 133 is identified as a primary storage system where the source volume is stored, volume 137 is identified as a copy of the source volume and storage system 134 is identified as a secondary storage system where the copy is stored.

At step 406, the management system detects whether a consistency formation event has been generated. In some implementations, the consistency formation event may be a point-in-time event and/or any other suitable type of event that triggers the creation of snapshots. The consistency formation event may be periodic in nature. For example, the consistency formation event may be generated every hour or every 5 hours. The consistency formation event may be generated by another process in the management system 132 based on information that is contained in the VDG definition 304, which specifies the duration of the time interval between consecutive consistency information events. If a consistency formation event is detected, process 400 proceeds to step 408. Otherwise, step 406 is repeated.

At step 408, the management system 132 creates snapshot data structures. The snapshot data structures may be created in the memory (i.e., in the storage devices) of each of the primary and secondary storage systems (identified at step 404). In some implementations, the management system 132 may issue a respective CREATE command to each of the primary and secondary storage systems (identified at step 404). Each of the primary and secondary storage systems may execute the CREATE command by instantiating one or more snapshot data structures. The snapshot data structures created in each of the storage systems may include one or more data structures that would constitute a snapshot when activated.

In some implementations, the instance of the CREATE command that is transmitted to the primary storage system (identified at step 404) may include an identifier of the source volume (e.g., volume 135). The identifier of the source volume may be retrieved from the VDG definition that is obtained at step 402. For example, the CREATE command instance that is transmitted to the primary storage system (e.g., storage system 133) may include the primary device identifier '550'.

Additionally or alternatively, in some implementations, the respective instance of the CREATE command that is transmitted to each of the secondary storage systems (identified at step 404) may include an identifier of the source volume copy that is stored in that storage system. The identifier of the copy of the source volume may be retrieved from the VDG definition (obtained at step 402). According to the present example, only one source volume (e.g., volume 135) and only one copy of the source volume (e.g., volume 137) are identified at step 404. Accordingly, the CREATE command is transmitted to only one secondary storage system (e.g., storage system 134), and this instance of the CREATE command may include the secondary device identifier '650'.

At step 410, the management system 132 suspends I/O in the primary storage system (identified at step 404). In some implementations, the management system 132 may issue a respective SUSPEND command to the primary storage system (identified at step 404). Upon receiving the SUSPEND command, the primary storage system may execute the SUSPEND command by stopping to accept and/or service incoming I/O requests. An I/O request may include a read request that involves reading data from the source volume (e.g., volume 135). As another example, an I/O request may include a write request that involves writing data to the source volume. Additionally or alternatively, an I/O request may include any request that involves the manipulation of data that is stored in the source volume. In some implementations, I/Os may be suspended only for the source volume(s) identified at step 404, rather than all volumes in the primary storage system(s) where the source volume(s) are stored.

At step 412, the management system 132 activates the snapshots, or snapshot data structures, that are created at step 408. In some implementations, the management system 132 may issue a respective ACTIVATE command to each of the primary and secondary storage systems that are identified at step 404. Upon receiving the ACTIVATE command, each of the primary and secondary storage systems may populate its respective one or more data structures (created at step 408) with any information that is missing thus turning the one or more data structures into a complete snapshot.

In some implementations, the instance of the ACTIVATE command that is transmitted to the primary storage system (identified at step 404) may include a primary device identifier of a source volume (e.g., volume 135) that is stored in the primary storage system. The identifier may be retrieved from the VDG definition (obtained at step 402). Additionally or alternatively, in some implementations, the respective instance of the ACTIVATE command that is transmitted to each secondary storage system may include a secondary device identifier 346. According to the present example, only one source volume and only one copy of the volume are identified at step 404. Accordingly, only one instance of the ACTIVATE command is transmitted to a secondary storage system (e.g., storage system 134), and this instance may include the secondary device identifier '650'.

At step 414, the management system 132 determines if each of the ACTIVATE commands (transmitted at step 412) has been executed successfully. Specifically, the management system 132 may determine whether a respective acknowledgment (hereinafter "ACK") has been received from each of the primary and secondary storage systems in response to the ACTIVATE command that is transmitted to that storage system. If a respective ACK has not been received from each of the primary and secondary storage systems to which an ACTIVATE command is sent (at step 414), step 414 is repeated. If at least one of the ACTIVATE commands has timed out or has otherwise been determined to have failed, process 400 proceeds to step 418. If a respective ACK is received for each of the ACTIVATE commands transmitted at step 412, process 400 proceeds to step 416.

At step 416, the management system 132 resumes I/Os in the primary storage system (identified at step 404). In some implementations, the management system 132 may transmit a respective RESUME command to the primary storage system. Upon receiving the RESUME command, the primary storage system may resume servicing I/Os for the source volume.

At step 418, the management system 132, transitions into an abnormal state. In some implementations, transitioning the management system 132 may include storing in memory an indication that at least one of the ACTIVATE commands (transmitted at step 412) has timed out or failed. Additionally or alternatively, in some implementations, transitioning the management system 132 into an abnormal state may include performing any suitable type of action for handling the failure and/or timeout of the ACTIVATE command. By way of example, the action may include retransmitting the ACTIVATE command or deleting any data structures that were instantiated for the snapshot whose creation failed, etc. It will be understood that the present disclosure is not limited to any specific manner for handling ACTIVATE command time-outs and/or failures. After step 418 is completed, process 400 returns to step 416.

In the example of FIG. 4, only one source volume and one copy of the source volume are identified at step 404. However, alternative implementations are possible in which multiple copies of the source volume are identified that are stored in different secondary storage systems. In such implementations, the management system 132 may use the technique described with respect to steps 406-418 to cause each of the secondary storage systems to create a snapshot of the volume copy that is stored in that storage system.

In the example of FIG. 4, only one source volume is identified at step 404. However, alternative implementations are possible in which multiple source volumes are identified, as well as at least one respective copy of each of the source volumes. In such implementations, the management system 132 may use the technique described with respect to steps 406-418 to create snapshots of each of the source volumes and their corresponding copies.

In the example of FIG. 4, process 400 checks whether each of the ACTIVATE commands has been completed successfully. However, it will be understood that process 400 may perform a similar check with respect to the CREATE commands transmitted at step 408. If any of the CREATE commands times out or fails, process 400 may handle the timeout or failure by re-transmitting the command or in any other suitable manner.

The framework described with respect to FIGS. 1-4 is advantageous because it minimizes the duration for which I/Os need to be suspended in order for snapshots to be created. In conventional systems, I/Os in primary and secondary storage systems may be suspended during separate time intervals. However, the suspension of I/Os in the secondary storage system may necessitate the suspension of I/Os in the primary storage system if synchronous replication is practiced between the primary and secondary storage systems. It will be recalled that when synchronous replication is practiced, the states of a volume (in the primary storage system) and the copy of the volume (in the secondary storage system) need to be synchronized before an I/O that caused the volume to change states is acknowledged to the sender of the I/O. Thus, in a conventional arrangement, I/O's in the primary storage system may have to be suspended twice—to create snapshots of the volume and volume copy, whereas in the example of FIGS. 1-4, I/Os need to be suspended only once. Suspending I/Os only once increases the availability of the primary storage, resulting in a better user experience.

In another aspect, the ability to suspend I/Os only once is made possible by the introduction of an improved format of the VDG definition that controls snapshot creation. As discussed above with respect to FIG. 3B, the VDG definition 304 is configured to include both a primary device portion and a secondary device portion, which in turn enables the management system 132 to identify both a volume and copies of the volume for the purpose of creating snapshots of the volume and its copies.

In yet another aspect, process 400 is further configured to shorten the time for which I/Os are suspended by creating the snapshot data structures (at step 408) before suspending the I/Os (at step 410). In this regard, at least some of the work towards creating the snapshots is performed while I/Os are still being serviced, thus causing I/Os to be suspended only during the performance of tasks that cannot possibly be performed with the I/Os still active.

Figure 5:
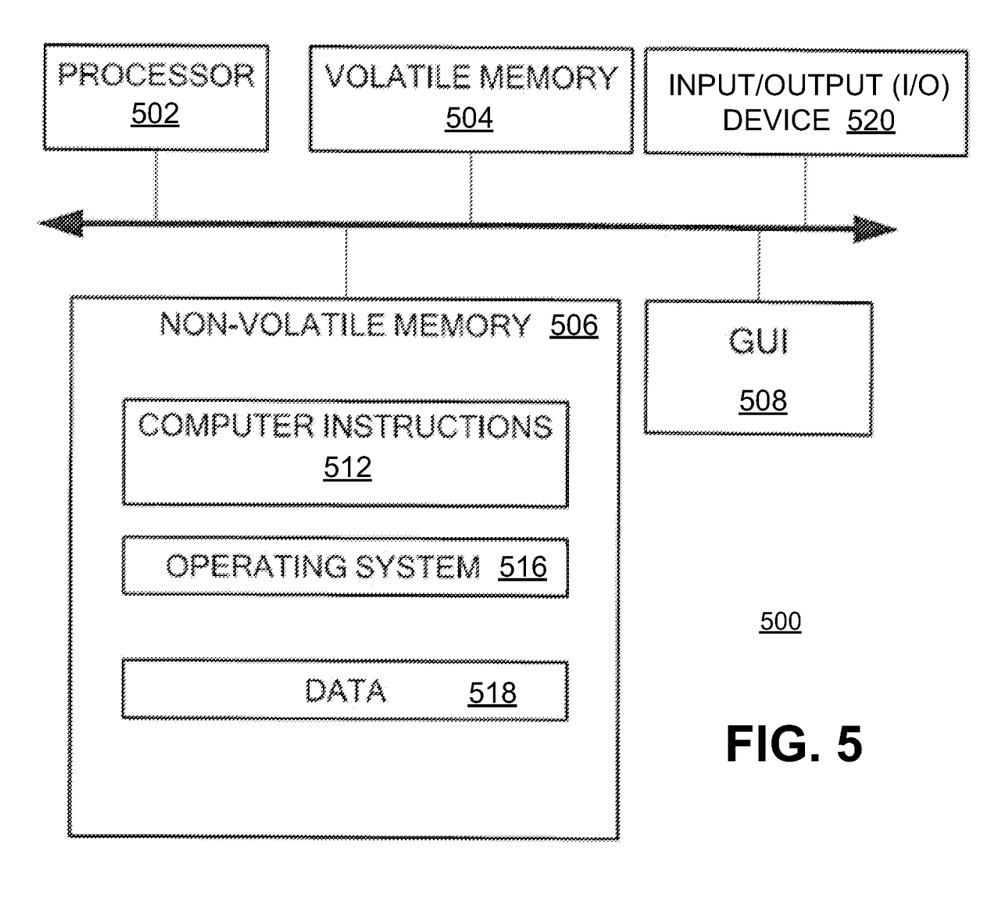
FIG. 5 is a diagram of an example of a computing device, according to aspects of the disclosure.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   retrieving a cross-platform version data group (VDG) definition, wherein the VDG definition includes a general portion, a primary device portion, and a secondary device portion, the primary device portion including an identifier of a volume and an identifier of a primary storage system where the volume is stored, the secondary device portion including an identifier of a copy of the volume and an identifier of a secondary storage system where the copy is stored, and the general portion identifying an interval at which a point-in-time event should be generated for creating snapshots of the volume;
   processing the VDG definition to identify the primary storage system and the secondary storage system as targets for creating snapshots of the volume;
   detecting a point-in-time event that is generated in accordance with the interval specified in the generation of the VDG definition;
   transmitting, to the primary storage system, a first instruction to initialize one or more data structures for a first snapshot of the volume;
   transmitting, to the secondary storage system, a second instruction to initialize one or more data structures for a snapshot of the copy of the volume that is stored in the secondary storage system;
   suspending servicing of input-output (I/O) for the volume by the primary storage system after each of the first and second instructions has been transmitted;
   transmitting to the primary storage system a third instruction to complete the first snapshot of the volume that is stored in the primary storage system;
   transmitting to the secondary storage system a fourth instruction to complete a snapshot of the copy of the volume that is stored in the secondary storage system; and
   resuming servicing of I/O by the primary storage system.

2. The method of claim 1, wherein the primary storage system is configured to perform synchronous replication of data to the secondary storage system.

3. The method of claim 1, wherein each of the third and fourth instructions includes an ACTIVATE command.

4. The method of claim 1, wherein the VDG definition includes a different respective identifier for each of plurality of copies of the volume.

5. The method of claim 1, wherein the VDG definition includes at least one of a script, a text file, and/or a configuration file.

6. A system, comprising:
   a memory; and
   at least one processor that is operatively coupled to the memory, the at least one processor being configured to perform the operations of:
   retrieving a cross-platform version data group (VDG) definition, wherein the VDG definition includes a general portion, a primary device portion, and a secondary device portion, the primary device portion including an identifier of a volume and an identifier of a primary storage system where the volume is stored, the secondary device portion including an identifier of a copy of the volume and an identifier of a secondary storage system where the copy is stored, and the general portion identifying an interval at which a point-in-time event should be generated for creating snapshots of the volume;
   processing the VDG definition to identify the primary storage system and the secondary storage system as targets for creating snapshots of the volume;
   detecting a point-in-time event that is generated in accordance with the interval specified in the general portion of the VDG definition;
   transmitting, to the primary storage system, a first instruction to initialize one or more data structures for a first snapshot of the volume;
   transmitting, to the secondary storage system, a second instruction to initialize one or more data structures for a snapshot of the copy of the volume that is stored in that secondary storage system;
   suspending servicing of input-output (I/O) for the volume by the primary storage system after each of the first and second instructions has been transmitted;
   transmitting to the primary storage system a third instruction to complete the first snapshot of the volume that is stored in the primary storage system;
   transmitting to each of the secondary storage system a fourth instruction to complete a snapshot of the copy of the volume that is stored in that secondary storage system; and
   resuming servicing of I/O by the primary storage system.

7. The system of claim 6, wherein the primary storage system is configured to perform synchronous replication of data to the secondary storage system.

8. The system of claim 6, wherein each of the third and fourth instructions includes an ACTIVATE command.

9. The system of claim 6, wherein the VDG definition includes a different respective identifier for each of a plurality of copies of the volume.

10. The system of claim 6, wherein the VDG definition includes at least one of a script, a text file, and/or a configuration file.

11. A non-transitory computer-readable medium storing one or more processor-executable instructions, which, when executed by at least one processor, cause the at least one processor to perform the operations of:

retrieving a cross-platform version data group (VDG) definition, wherein the VDG definition includes a general portion, a primary device portion, and a secondary device portion, the primary device portion including an identifier of a volume and an identifier of a primary storage system where the volume is stored, the secondary device portion including an identifier of a copy of the volume and an identifier of a secondary storage system where the copy is stored, and the general portion identifying an interval at which a point-in-time event should be generated for creating snapshots of the volume;

processing the VDG definition to identify the primary storage system and the secondary storage system as targets for creating snapshots of the volume;

detecting a point-in-time event that is generated in accordance with the interval specified in the general portion of the VDG definition;

transmitting, to the primary storage system, a first instruction to initialize one or more data structures for a first snapshot of the volume;

transmitting, to the secondary storage system, a second instruction to initialize one or more data structures for a snapshot of the copy of the volume that is stored in that secondary storage system;

suspending servicing of input-output (I/O) for the volume by the primary storage system after each of the first and second instructions has been transmitted;

transmitting to the primary storage system a third instruction to complete the first snapshot of the volume that is stored in the primary storage system;

transmitting to the secondary storage system a fourth instruction to complete a snapshot of the copy of the volume that is stored in that secondary storage system; and resuming servicing of I/O by the primary storage system.

12. The non-transitory computer-readable medium of claim 11, wherein the primary storage system is configured to perform synchronous replication of data to the secondary storage system.

13. The non-transitory computer-readable medium of claim 11, wherein each of the third and fourth instructions includes an ACTIVATE command.

14. The non-transitory computer-readable medium of claim 11, wherein the VDG definition includes a different respective identifier for each of a plurality of copies of the volume.

15. The non-transitory computer-readable medium of claim 11, wherein the VDG definition includes at least one of a script, a text file, and/or a configuration file.

* * * * *